United States Patent
Rozen et al.

(10) Patent No.: US 7,671,654 B2
(45) Date of Patent: Mar. 2, 2010

(54) DEVICE HAVING CLOCK GENERATING CAPABILITIES AND A METHOD FOR GENERATING A CLOCK SIGNAL

(75) Inventors: Anton Rozen, Gedera (IL); Michael Priel, Hertzelia (IL); Amir Zaltzman, Moshav Amikam (IL)

(73) Assignee: Freescale Semiconductor, Inc., Austin, TX (US)

( * ) Notice: Subject to any disclaimer, the term of this patent is extended or adjusted under 35 U.S.C. 154(b) by 48 days.

(21) Appl. No.: 12/163,624

(22) Filed: Jun. 27, 2008

(65) Prior Publication Data
US 2009/0322385 A1      Dec. 31, 2009

(51) Int. Cl.
*H03K 3/00*      (2006.01)

(52) U.S. Cl. .......................... 327/291; 327/98; 327/298; 327/237

(58) Field of Classification Search .............. 327/98–99, 327/231, 237, 239, 241–242, 291, 293–295, 327/298, 299
See application file for complete search history.

(56) References Cited

U.S. PATENT DOCUMENTS

| | | | |
|---|---|---|---|
| 6,445,228 B1 | 9/2002 | Nguyen | |
| 6,483,888 B1 | 11/2002 | Boerstler et al. | |
| 6,617,904 B1 * | 9/2003 | Schwarz et al. | 327/295 |
| 7,236,040 B2 * | 6/2007 | Chan et al. | 327/295 |
| 2003/0048118 A1 | 3/2003 | Nguyen et al. | |
| 2003/0074595 A1 | 4/2003 | Brock et al. | |
| 2005/0057285 A1 | 3/2005 | Austin et al. | |
| 2006/0091928 A1 | 5/2006 | Kapur | |

\* cited by examiner

*Primary Examiner*—An T Luu

(57) ABSTRACT

A method for generating a clock signal and a device having clock generating capabilities, the device includes: (i) a first divider, adapted to receive an input clock signal and divide the input clock signal to provide a first clock signal; (ii) a second divider, adapted to receive an input clock signal and divide the input clock signal to provide a second clock signal; wherein the first clock signal is phase shifted in relation to the second clock signal by half an input clock cycle; wherein a delay period of the first divider substantially equals a delay period of the second divider over a large range of delay affecting parameter values; (iii) a reconstruction circuit, connected to the first and second divider circuits, adapted to receive the first and second clock signals and apply a logical operation on the first and second clock signals to provide a reconstructed clock signal; and (iv) a selection circuit, connected to the first divider, second divider and reconstruction circuit, adapted to output an output clock signal in response to a selection signal that indicates whether to output the first clock signal, the second clock signal or the reconstructed clock signal.

20 Claims, 5 Drawing Sheets

US 7,671,654 B2

DEVICE HAVING CLOCK GENERATING CAPABILITIES AND A METHOD FOR GENERATING A CLOCK SIGNAL

FIELD OF THE INVENTION

The present invention relates to methods for generating a clock signal and a device that has clock generating capabilities.

BACKGROUND OF THE INVENTION

Modern integrated circuits include many modules that may require different clock signals. Many clock signals can be generated by dividing an input clock signal by a clock divider in order to provide a lower frequency clock signal. Some clock dividers should also be adapted to provide a non-divided version of an input clock signal.

In order to simplify the design of modules that are connected to the clock divider the provision of the non-divided version of the input clock and any divided version of the input clock signal should be characterized by the same delay period.

FIG. 1 illustrates prior art clock divider 10. Prior art clock divider 10 includes clock divider 20, bypass path 30 and selection circuit 40. Bypass path 30 includes a sequence of delay units such as inverters 32. Clock divider 20 includes a sequence of flip-flops 22 and combinational logic 24 that form a counter.

Clock divider 20 and bypass path 30 receive an input clock signal clkin 200. Clock divider 20 divides clkin 200 by a division ratio that differs from one. Bypass path 30 provides a delayed version of clkin 200.

Selection logic 40 outputs an output clock signal (either the delayed version of clkin 200 or a divided clock signal) to module 50.

Bypass path 30 and clock divider 20 can introduce the same delay over a very narrow temperature range, a very narrow voltage supply range and over a narrow process variation window.

In most cases bypass path 30 and clock divider 20 introduce different delays and the difference between these delays can be hard to predict. The delay difference can affect the manner in which module 50 operates.

SUMMARY OF THE PRESENT INVENTION

The present invention provides a method and a device as described in the accompanying claims. Specific embodiments of the invention are set forth in the dependent claims. These and other aspects of the invention will be apparent from and elucidated with reference to the embodiments described hereinafter.

BRIEF DESCRIPTION OF THE DRAWINGS

Further details, aspects, and embodiments of the invention will be described, by way of example only, with reference to the drawings.

DETAILED DESCRIPTION OF THE DRAWINGS

Because the apparatus implementing the present invention is, for the most part, composed of electronic components and circuits known to those skilled in the art, circuit details will not be explained in any greater extent than that considered necessary as illustrated above, for the understanding and appreciation of the underlying concepts of the present invention and in order not to obfuscate or distract from the teachings of the present invention.

In the following specification, the invention will be described with reference to specific examples of embodiments of the invention. It will, however, be evident that various modifications and changes may be made therein without departing from the broader spirit and scope of the invention as set forth in the appended claims.

It has been found that a bypass path and a clock dividing path can be implemented by using similar components, thus guaranteeing substantially the same delay over a large range or delay affecting parameters such as temperature, supply voltage and process variations.

Figure 2:
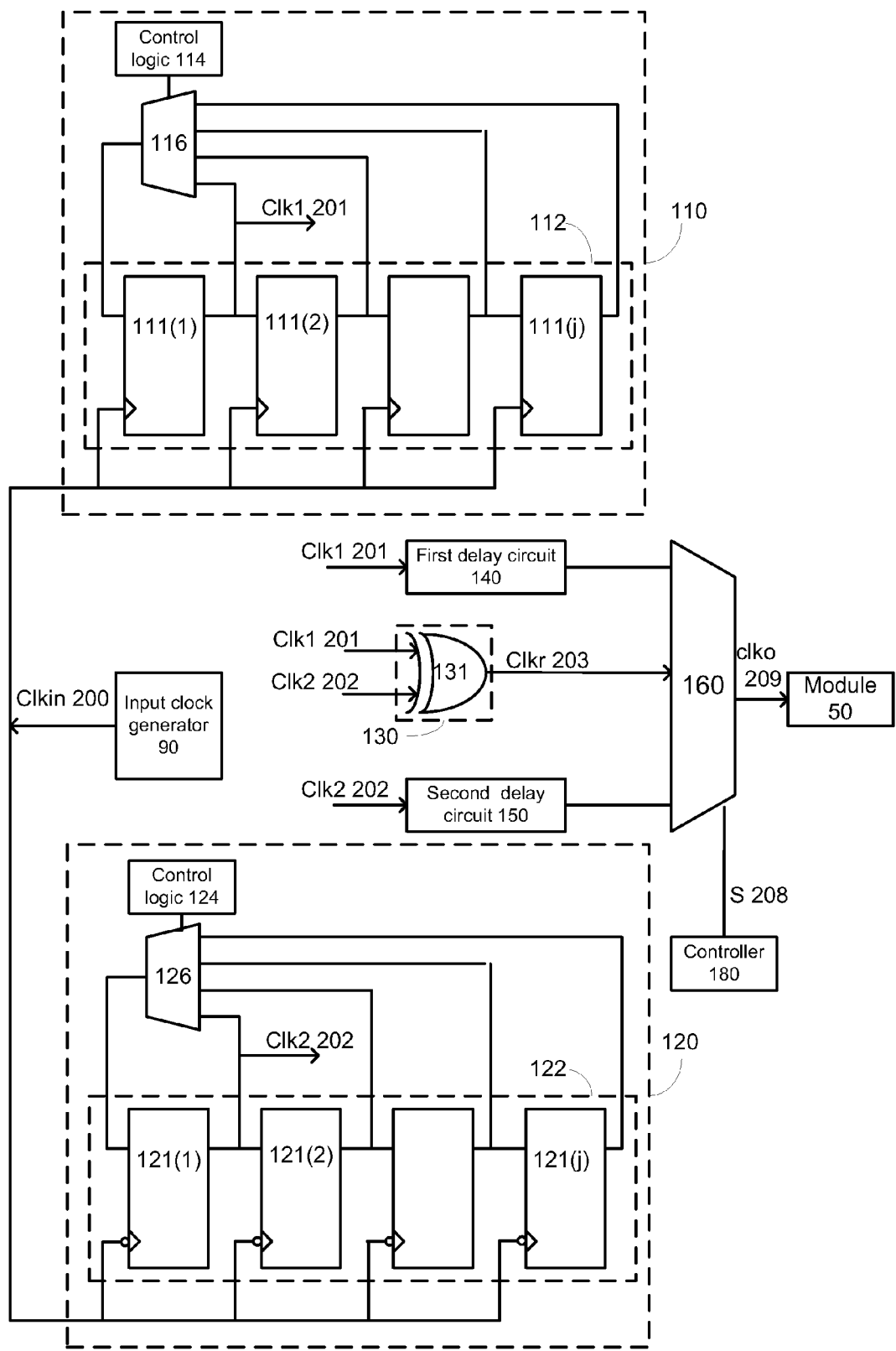
FIG. 2 schematically shows an example of an embodiment of a device that includes a clock divider.

FIG. 2 schematically shows an example of an embodiment of device 100 that has clock signal generating capabilities.

Device 100 can have information (data and/or media) processing capabilities. Device 100 can be a mobile device, such as, but not limited to, a laptop computer, a mobile phone, a media player, a mobile game console and the like. Device 100 can also be a stationary apparatus such as a desktop computer, a plasma screen, a television, a media entertainment system, a monitoring system, a stationary game console, a network node, a router, a switch, and the like. Device 100 can include one or more displays, processors, memory units, loudspeakers, microphones, DMA controllers, and the like. Device 100 can include multiple integrated circuits.

Figure 1:
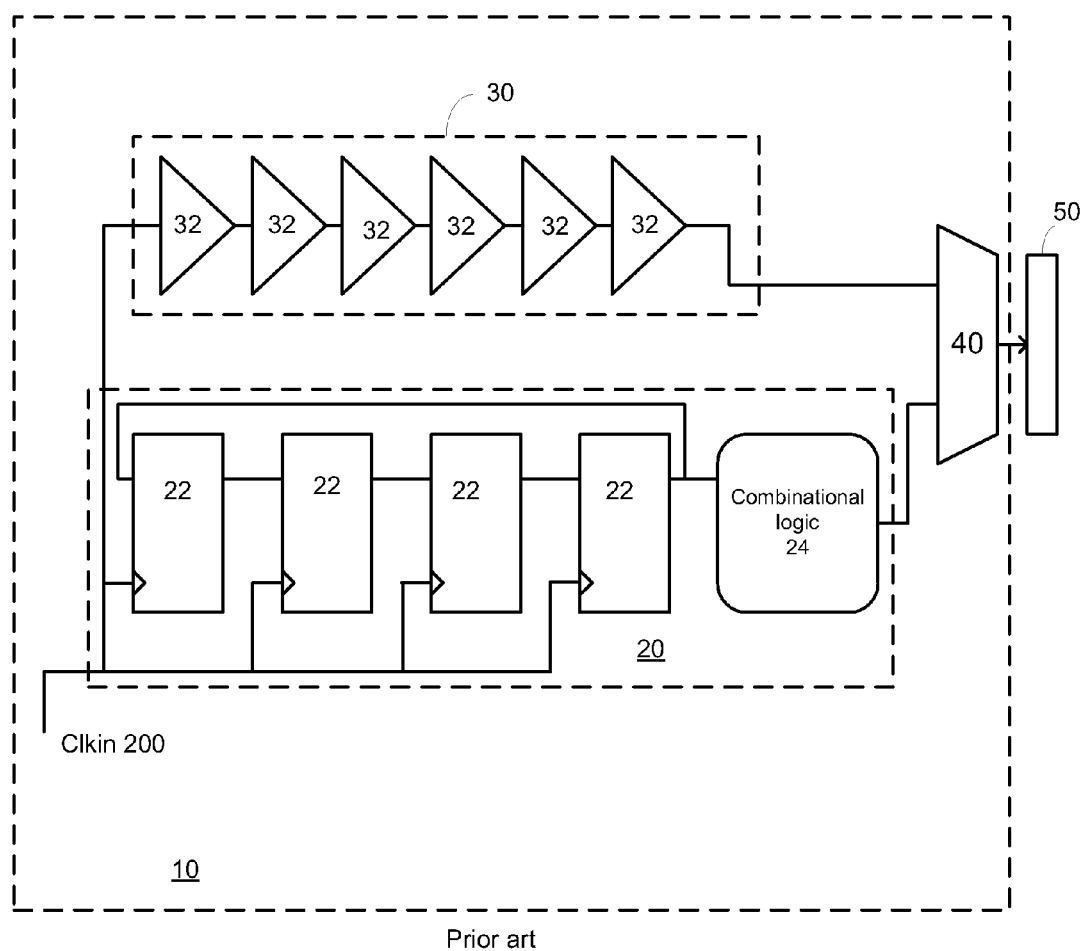
FIG. 1 illustrates a prior art clock divider.

In the example of FIG. 1, device 100 includes input clock generator 90, first divider 110, second divider 120, reconstruction circuit 130, first delay circuit 140, second delay circuit 150 and selection circuit 160.

Selection circuit 140 can receive a selection signal S 208 from controller 180. Controller 180 can also determine the division ratios of first and second dividers 110 and 120 and program first and second dividers 110 and 120 accordingly.

First divider 110 is adapted to receive input clock signal clkin 200 and divides it to provide first clock signal clk1 201.

Second divider 120 is adapted to receive input clock signal clkin 200 and divides it to provide second clock signal clk2 202.

Figure 3:
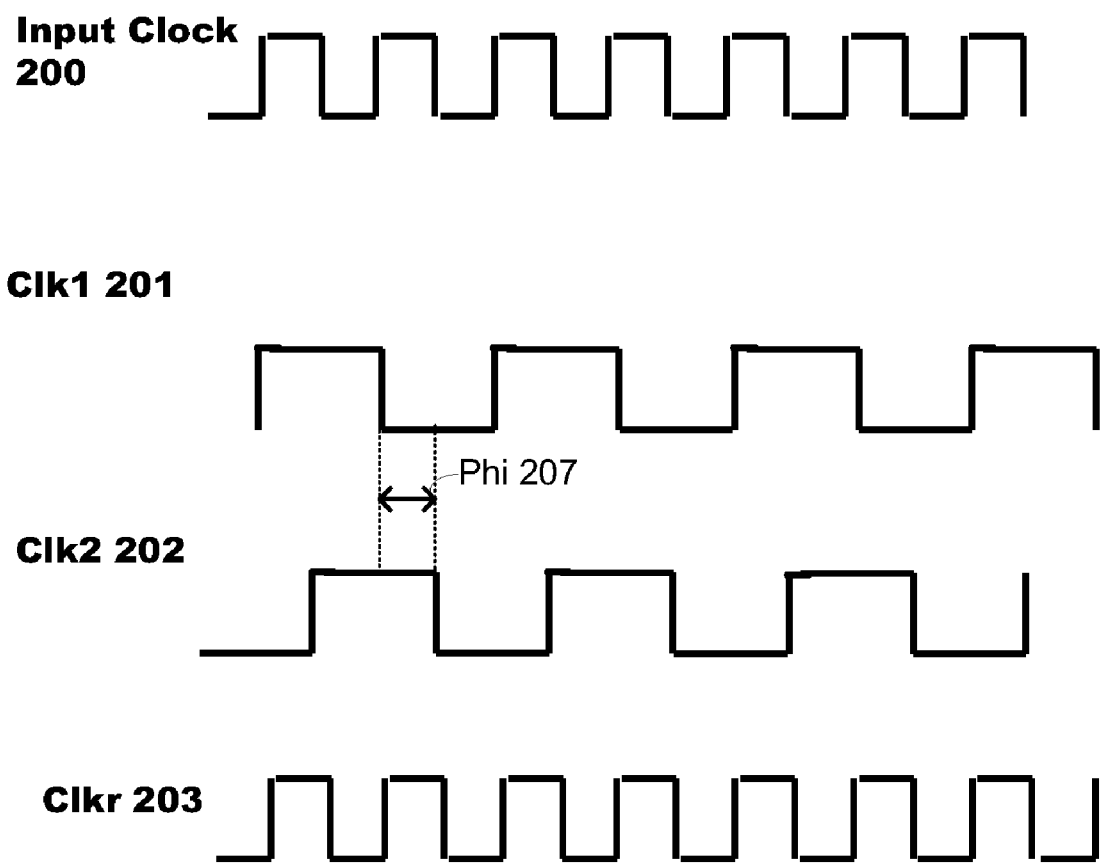
FIG. 3 schematically shows clock signals received by and generated by an example of an embodiment of a device that includes a clock divider.

First clock signal clk1 201 is phase-shifted in relation to second clock signal clk2 202 by half an input clock cycle. This phase shift is denoted Phi 207 in FIG. 3.

A delay period of first divider 110 substantially equals a delay period of second divider 120 over a large range of delay affecting parameter values. The delay affecting parameter can be temperature, supply voltage and any process variation. The large range can include an expected temperature range, an expected supply voltage range and expected process variation ranges or a substantial portion (for example, at least 80%) of each of these ranges.

In the example of FIG. 1, first divider 110 includes a positive edge triggered shift register 112, first multiplexer 116 and first control logic 114. Second divider 120 includes negative edge triggered shift register 122, second multiplexer 118 and second control logic 116. It is noted that both first and second control logics can be unified to provide a single control unit.

Input ports of first multiplexer 116 are connected to the output ports of positive edge triggered flip-flops 111(1)-111(j) of positive edge triggered shift register 112. The output port of first multiplexer 116 is connected to the input port of first positive edge triggered flip-flop 111(1). Positive edge triggered flip-flops 111(1)-111(j) are connected in a sequential manner to each other. The output of first divider 110 can be the output port of first positive edge triggered flip-flop 111(1) (as illustrated in the example of FIG. 1) or the output port of any other flip-flop.

Control logic 114 can determine, at any given time and in response to the requested division factor, which flip-flop output signal to provide to the input port of first positive edge triggered flip-flop 111(1).

Input ports of second multiplexer 126 are connected to the output ports of negative edge triggered flip-flops 121(1)-121(j) of negative edge triggered shift register 122. The output port of second multiplexer 126 is connected to the input port of first negative edge triggered flip-flop 121(1). Negative edge triggered flip-flops 121(1)-121(j) are connected in a sequential manner to each other. The output of second divider 120 can be the output port of first negative edge triggered flip-flop 121(1) (as illustrated in the example of FIG. 1) or the output port of any other flip-flop.

Control logic 124 can determine, at any given time and in response to the requested division factor, which flip-flop output signal to provide to the input port of first negative edge triggered flip-flop 121(1).

The generation of reconstructed clock signal clkr 203 requires both dividers 110 and 120 to be active but only one divider can be active or another clock signal (clk1 201 or clk2 202) is required.

Reconstruction circuit 130 is connected to first and second divider circuits 110 and 120, and is adapted to receive first and second clock signals clk1 201 and clk2 202 and to apply a logical operation on these clock signals to provide a reconstructed clock signal clkr 203. In the example of FIG. 2 reconstruction circuit 130 includes XOR gate 131. It receives as inputs first and second clock signals clk1 201 and clk2 202 and applies a XOR operation on them to provide reconstructed clock signal clkr 203.

The output port of first divider 110 is connected to an input of first delay circuit 140. An output port of first delay circuit 140 is connected to a first input port of selection circuit 160 to provide a delayed version of first clock signal clk1 201.

The output port of second divider 120 is connected to an input of second delay circuit 150. An output port of second delay circuit 150 is connected to a second input port of selection circuit 160 to provide a delayed version of second clock signal clk2 202.

The delay period of first delay circuit 140, second delay circuit 150 and reconstruction circuit 130 substantially equal each other over the large range of delay affecting parameter values.

Conveniently, these circuits include the same components—such as the same logic gates. For example, each circuit can include a XOR gate. Wherein first delay circuit 140 applies a XOR operation on first clock signal clk1 201 and "0" while second delay circuit 150 applies a XOR operation on second clock signal clk2 202 and "0".

Selection circuit 160 is connected to first and second delay circuits 140 and 150, reconstruction unit 130. It receives selection signal S 208 from controller 180 and can select, in response to the value of that selection signal, which clock signal to output. Selection unit 160 can be a multiplexer.

Device 10 generates an output clock signal regardless of the division ratio (1 or not) by passing the input clock signal through flip-flops, thus the same delay is expected despite changes in the temperature, supply voltage level of process variations.

The clock signals generated by different paths (first divider 110, second divider 120) are responsive to edges of the input clock signal and thus are relatively balanced.

Because each clock divider out of clock dividers 110 and 120 includes multiple flip-flops but only a single combinational cell (a single multiplexer per clock divider) then high frequency clock signals can be generated.

Figure 4:
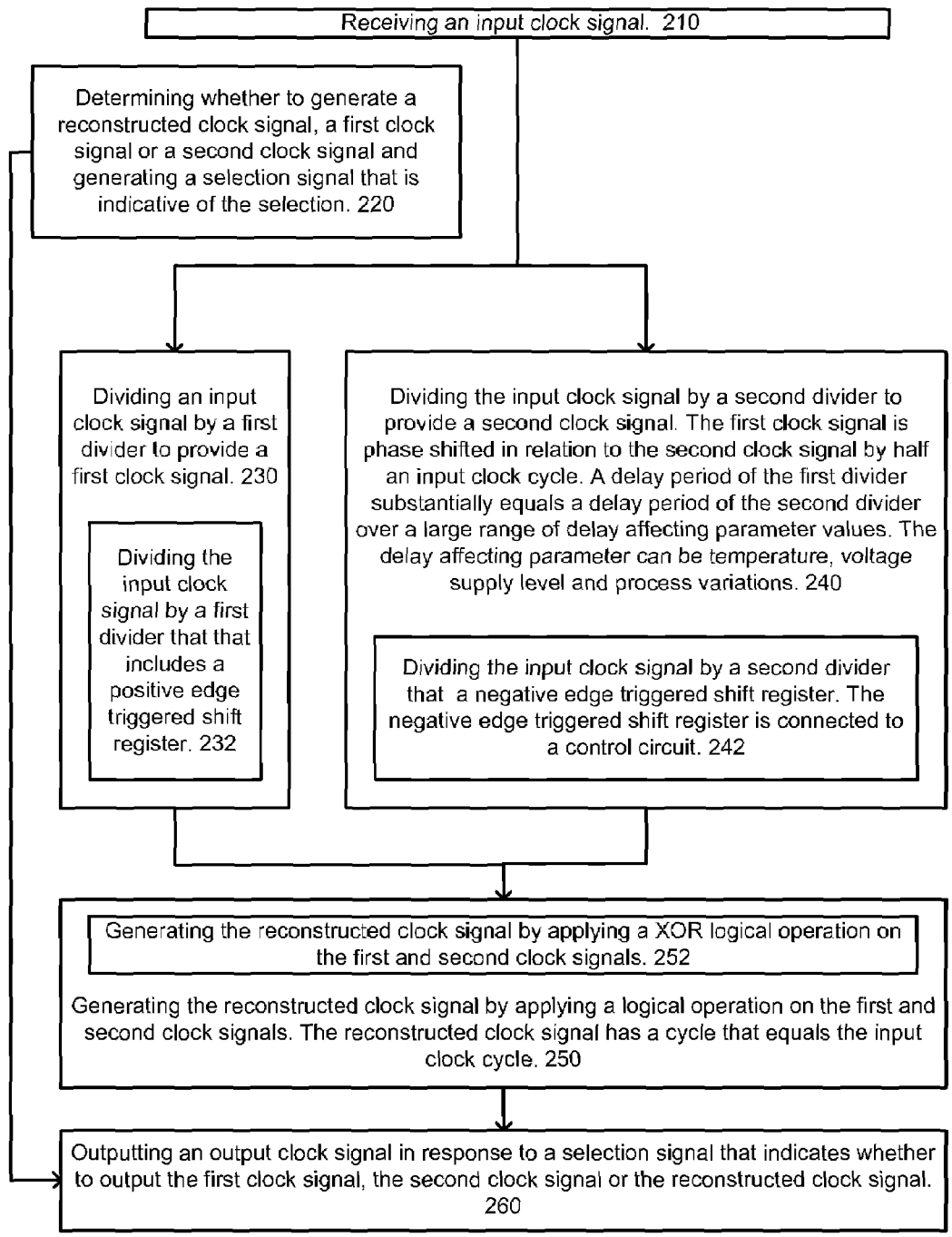
FIG. 4 schematically shows a flow-chart of a first example of an embodiment of a method for generating a clock signal.

FIG. 4 schematically shows an example of an embodiment of method 200 for generating a clock signal.

Method 200 starts by stages 210 and 220. Stage 210 includes receiving an input clock signal. Stage 220 includes determining whether to generate a reconstructed clock signal, a first clock signal or a second clock signal and generating a selection signal that is indicative of the selection.

Stage 210 is followed by stage 230 and 240.

Stage 230 includes dividing an input clock signal by a first divider to provide a first clock signal. Stage 240 includes dividing the input clock signal by a second divider to provide a second clock signal. The first clock signal is phase shifted in relation to the second clock signal by half an input clock cycle. A delay period of the first divider substantially equals a delay period of the second divider over a large range of delay affecting parameter values. The delay affecting parameter can be temperature, voltage supply level and process variations.

Stage 230 can include stage 232 of dividing the input clock signal by a first divider that includes a positive edge triggered shift register. The positive edge triggered shift register is connected to a control circuit Stage 240 can include stage 242 of dividing the input clock signal by a second divider that includes a negative edge triggered shift register. The negative edge triggered shift register is connected to a control circuit.

Stages 230 and 240 are followed by stage 250 of generating the reconstructed clock signal by applying a logical operation on the first and second clock signals. The reconstructed clock signal has a cycle that equals the input clock cycle.

Conveniently, the reconstructed clock signal is phase shifted in relation to the input clock signal by an insignificant fraction of an input clock cycle.

Stage 250 can include stage 252 of generating the reconstructed clock signal by applying a XOR operation on the first and second clock signals.

Stage 250 is followed by stage 260 of outputting an output clock signal in response to a selection signal that indicates whether to output the first clock signal, the second clock signal or the reconstructed clock signal.

Figure 5:
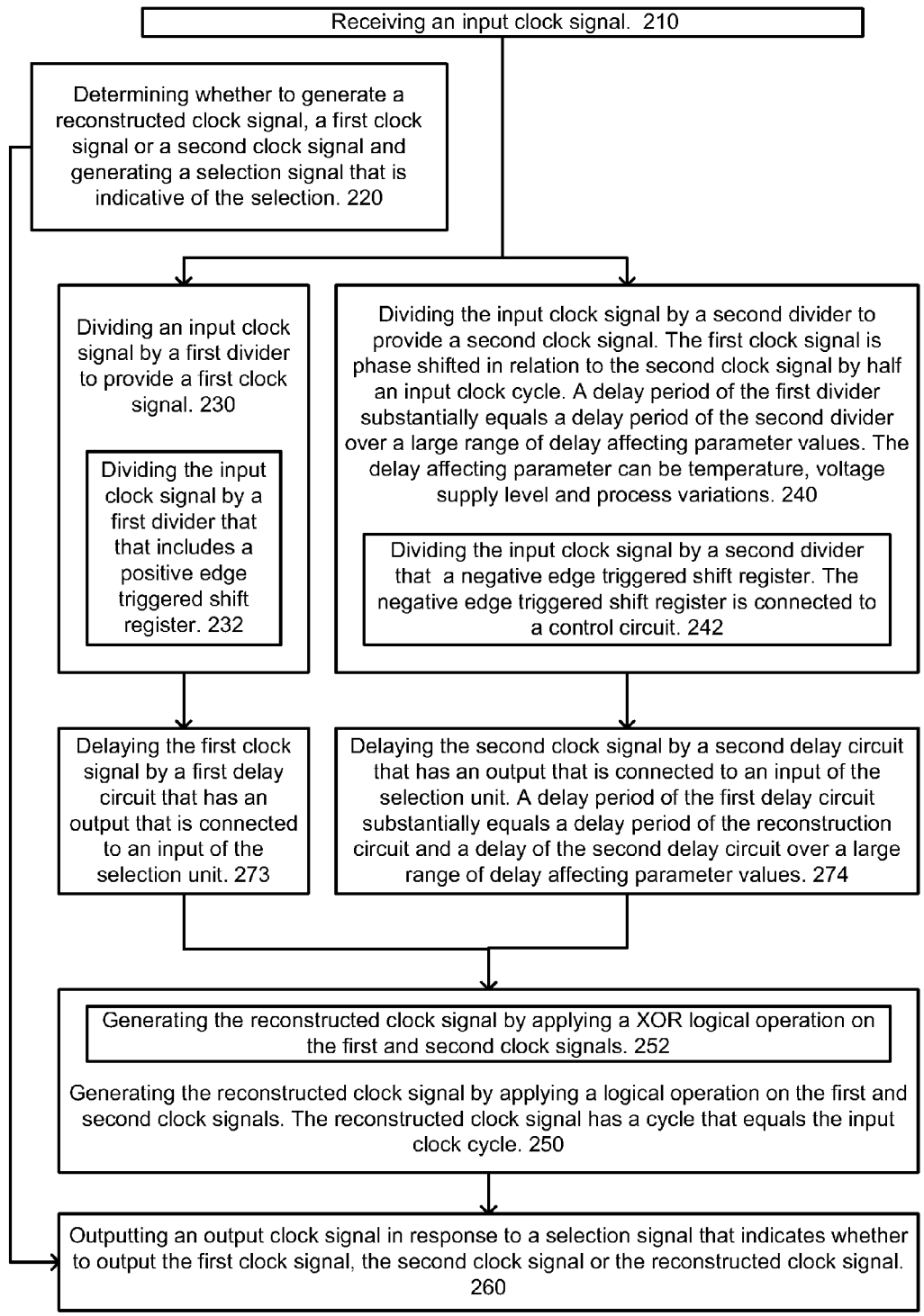
FIG. 5 schematically shows a flow-chart of a second example of an embodiment of a method for generating a clock signal.

FIG. 5 schematically shows an example of an embodiment of method 300 for generating a clock signal.

Method 300 differs from stage 200 by including stages 273 and 274. These stages are followed by stage 260. Stage 273 follows stage 230 and stage 274 follows stage 240.

Stage 273 includes delaying the first clock signal by a first delay circuit that has an output that is connected to an input of the selection unit.

Stage 274 includes delaying the second clock signal by a second delay circuit that has an output that is connected to an input of the selection unit. A delay period of the first delay circuit substantially equals a delay period of the reconstruction circuit and a delay of the second delay circuit over a large range of delay affecting parameter values.

Stages 273 and 274 can be implemented by using delay circuits that are similar to the reconstruction unit and especially can include the same logic gates included in the reconstruction unit.

Stage 273 can include delaying the first clock signal by a XOR gate that applies a XOR operation on the first clock signal and a constant.

Stage 274 can include delaying the second clock signal by a XOR gate that applies a XOR operation on the second clock signal and a constant.

The conductors as discussed herein may be illustrated or described in reference to being a single conductor, a plurality of conductors, unidirectional conductors, or bidirectional conductors. However, different embodiments may vary the implementation of the conductors. For example, separate unidirectional conductors may be used rather than bidirectional conductors and vice versa. In addition, plurality of conductors may be replaced with a single conductor that transfers multiple signals serially or in a time-multiplexed manner. Likewise, single conductors carrying multiple signals may be separated out into various different conductors carrying subsets of these signals. Therefore, many options exist for transferring signals.

Although the invention has been described with respect to specific conductivity types or polarity of potentials, skilled artisans appreciated that conductivity types and polarities of potentials may be reversed.

Furthermore, those skilled in the art will recognize that boundaries between the functionality of the above described operations are merely illustrative. The functionality of multiple operations may be combined into a single operation, and/or the functionality of a single operation may be distributed in additional operations. Moreover, alternative embodiments may include multiple instances of a particular operation, and the order of operations may be altered in various other embodiments.

Thus, it is to be understood that the architectures depicted herein are merely exemplary, and that in fact many other architectures can be implemented which achieve the same functionality. In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

In addition, the invention is not limited to physical devices or units implemented in non-programmable hardware but can also be applied in programmable devices or units able to perform the desired device functions by operating in accordance with suitable program code. Furthermore, the devices may be physically distributed over a number of apparatuses, while functionally operating as a single device.

However, other modifications, variations, and alternatives are also possible. The specifications and drawings are, accordingly, to be regarded in an illustrative rather than in a restrictive sense.

The word 'comprising' does not exclude the presence of other elements or steps then those listed in a claim. Moreover, the terms "front," "back," "top," "bottom," "over," "under" and the like in the description and in the claims, if any, are used for descriptive purposes and not necessarily for describing permanent relative positions. It is understood that the terms so used are interchangeable under appropriate circumstances such that the embodiments of the invention described herein are, for example, capable of operation in other orientations than those illustrated or otherwise described herein.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

We claim:

1. A method for generating a clock signal, the method comprises:
    dividing an input clock signal by a first divider to provide a first clock signal;
    dividing the input clock signal by a second divider to provide a second clock signal; wherein the first clock signal is phase shifted in relation to the second clock signal by half an input clock cycle; wherein a delay period of the first divider substantially equals a delay period of the second divider over a large range of delay affecting parameter values; and
    generating the reconstructed clock signal by applying a logical operation on the first and second clock signals; wherein the reconstructed clock signal has a cycle that equals the input clock cycle;
    outputting an output clock signal in response to a selection signal that indicates whether to output the first clock signal, the second clock signal or the reconstructed clock signal.

2. The method according to claim 1 comprising:
    dividing the input clock signal by a first divider that comprises a positive edge triggered shift register; and
    dividing the input clock signal by a second divider that comprises a negative edge triggered shift register;
    wherein each of the positive edge triggered shift register and negative edge triggered shift register is coupled to a control circuit.

3. The method according to claim 1 comprising generating the reconstructed clock signal by applying a XOR operation on the first and second clock signals.

4. The method according to claim 1 comprising:
    providing the selection signal to a selection unit that outputs the selected clock signal;
    applying the logical operation by the reconstruction circuit to provide the reconstructed clock signal to a selection unit
    delaying the first clock signal by a first delay circuit that has an output that is coupled to an input of the selection unit;
    delaying the second clock signal by a second delay circuit that has an output that is coupled to an input of the selection unit;
    wherein a delay period of the first delay circuit substantially equals a delay period of the reconstruction circuit and a delay of the second delay circuit over a large range of delay affecting parameter values.

5. The method according to claim 4 wherein each of the first and second delay circuits comprises a logical gate that equals a logical gate of the logical circuit.

6. The method according to claim 1 wherein each of the first delay circuit, the second delay circuit and the reconstruction circuit comprises a XOR logic gate that applies a XOR operation on at least one clock signal.

7. The method according to claim 1 wherein a delay period of the first divider substantially equals a delay period of the second divider over a large range of temperatures.

8. The method according to claim 1 wherein a delay period of the first divider substantially equals a delay period of the second divider over a large range of voltage supply levels.

9. The method according to claim 1 wherein a delay period of the first divider substantially equals a delay period of the second divider over a large range of process variations.

10. The method according to claim 1 wherein the reconstructed clock signal is phase shifted in relation to the input clock signal by an insignificant fraction of an input clock cycle.

11. A device having clock generating capabilities, the device comprises:
    a first divider, adapted to receive an input clock signal and divide the input clock signal to provide a first clock signal;
    a second divider, adapted to receive the input clock signal and divide the input clock signal to provide a second clock signal;
    wherein the first clock signal is phase shifted in relation to the second clock signal by half an input clock cycle;
    wherein a delay period of the first divider substantially equals a delay period of the second divider over a large range of delay affecting parameter values; and
    a reconstruction circuit, coupled to the first and second divider circuits, adapted to receive the first and second clock signals and apply a logical operation on the first and second clock signals to provide a reconstructed clock signal; and
    a selection circuit, coupled to the first divider, second divider and reconstruction circuit, adapted to output an output clock signal in response to a selection signal that indicates whether to output the first clock signal, the second clock signal or the reconstructed clock signal.

12. The device according to claim 11 wherein the first divider comprises a positive edge triggered shift register and the second divider comprises a negative edge triggered shift register; wherein each of the positive edge triggered shift register and negative edge triggered shift register is coupled to a control circuit.

13. The device according to claim 11 wherein the reconstruction circuit comprises a XOR logic gate that applies a XOR operation on the first and second clock signals.

14. The device according to claim 11 comprising:
    a first delay circuit coupled between the first divider and the selection unit;
    a second delay circuit coupled between the second divider and the selection unit;
    wherein a delay period of the first delay circuit substantially equals a delay period of the reconstruction circuit and a delay of the second delay circuit over a large range of delay affecting parameter values.

15. The device according to claim 14 wherein each of the first and second delay circuits comprises a logical gate that equals a logical gate of the logical circuit.

16. The device according to claim 11 wherein each of the first delay circuit, the second delay circuit and the reconstruction circuit comprises a XOR logic gate.

17. The device according to claim 11 wherein a delay period of the first divider substantially equals a delay period of the second divider over a large range of temperatures.

18. The device according to claim 11 wherein a delay period of the first divider substantially equals a delay period of the second divider over a large range of voltage supply levels.

19. The device according to claim 11 wherein a delay period of the first divider substantially equals a delay period of the second divider over a large range of process variations.

20. The device according to claim 11 wherein the reconstructed clock signal is phase shifted in relation to the input clock signal by an insignificant fraction of an input clock cycle.

* * * * *